US011419264B1

(12) United States Patent
King

(10) Patent No.: US 11,419,264 B1
(45) Date of Patent: Aug. 23, 2022

(54) LAWN MOWER WITH SWIVELING REAR WHEELS

(71) Applicant: Richard Neil King, Indianapolis, IN (US)

(72) Inventor: Richard Neil King, Indianapolis, IN (US)

( * ) Notice: Subject to any disclaimer, the term of this patent is extended or adjusted under 35 U.S.C. 154(b) by 0 days.

(21) Appl. No.: 17/646,402

(22) Filed: Dec. 29, 2021

Related U.S. Application Data

(60) Provisional application No. 63/260,856, filed on Sep. 2, 2021.

(51) Int. Cl.
A01D 34/67 (2006.01)
A01D 34/82 (2006.01)
A01D 34/81 (2006.01)
A01D 34/00 (2006.01)
A01D 101/00 (2006.01)

(52) U.S. Cl.
CPC ............ A01D 34/81 (2013.01); A01D 34/00 (2013.01); A01D 34/67 (2013.01); A01D 34/82 (2013.01); A01D 2101/00 (2013.01)

(58) Field of Classification Search
CPC ........ A01B 45/00–026; A01D 2101/00; A01D 34/00; A01D 34/001; A01D 34/08; A01D 34/46; A01D 34/67; A01D 34/824; A01D 34/81; A01D 34/82
See application file for complete search history.

(56) References Cited

U.S. PATENT DOCUMENTS

| 505,187 | A | * | 9/1893 | Carr | A01D 2101/00 56/254 |
| 2,551,817 | A | * | 5/1951 | Taylor | A01D 34/74 56/255 |
| 3,303,524 | A | * | 2/1967 | Schneider | A47L 11/4058 15/49.1 |
| 3,783,592 | A | * | 1/1974 | Schraut | A01D 34/62 56/249.5 |
| 5,960,615 | A | * | 10/1999 | Meetze | A01D 34/001 16/35 R |
| 6,378,280 | B1 | * | 4/2002 | Bone | A01D 34/74 280/43.13 |
| 2008/0029278 | A1 | * | 2/2008 | Wynings | A01B 45/02 172/22 |
| 2010/0229402 | A1 | * | 9/2010 | Trethowan | A01D 34/416 30/296.1 |

(Continued)

FOREIGN PATENT DOCUMENTS

| DE | 29707231 U1 | * | 6/1998 | ............ A01D 34/67 |
| DE | 29919553 U1 | * | 2/2000 | ........... A01D 34/001 |
| DE | 102005026250 A1 | * | 12/2006 | ............ A01D 34/68 |

Primary Examiner — Adam J Behrens
(74) Attorney, Agent, or Firm — Dunlap Bennett & Ludwig, PLLC

(57) ABSTRACT

A lawn mower according to the present invention comprises two swiveling rear wheels, each underneath a dome built into a deck of the lawn mower. The rear wheels may rotate on a rotational axis within a bracket. The bracket does not rotate while the rear wheel rotates. The rear wheels may also swivel within their corresponding dome on a swivel axis, perpendicular to the rotational axis. The swivel and rotation of the rear wheel enable a pivoting of the lawn mower with a front wheel as the fulcrum of said pivot.

4 Claims, 4 Drawing Sheets

(56) References Cited

U.S. PATENT DOCUMENTS

| | | | |
|---|---|---|---|
| 2013/0128043 A1* | 5/2013 | Avnery | H04N 7/181 |
| | | | 348/148 |
| 2016/0309653 A1* | 10/2016 | Morabit | A01D 34/416 |
| 2019/0136949 A1* | 5/2019 | Khayatian | A01D 34/6806 |
| 2021/0204462 A1* | 7/2021 | Lee | A01B 45/026 |

* cited by examiner

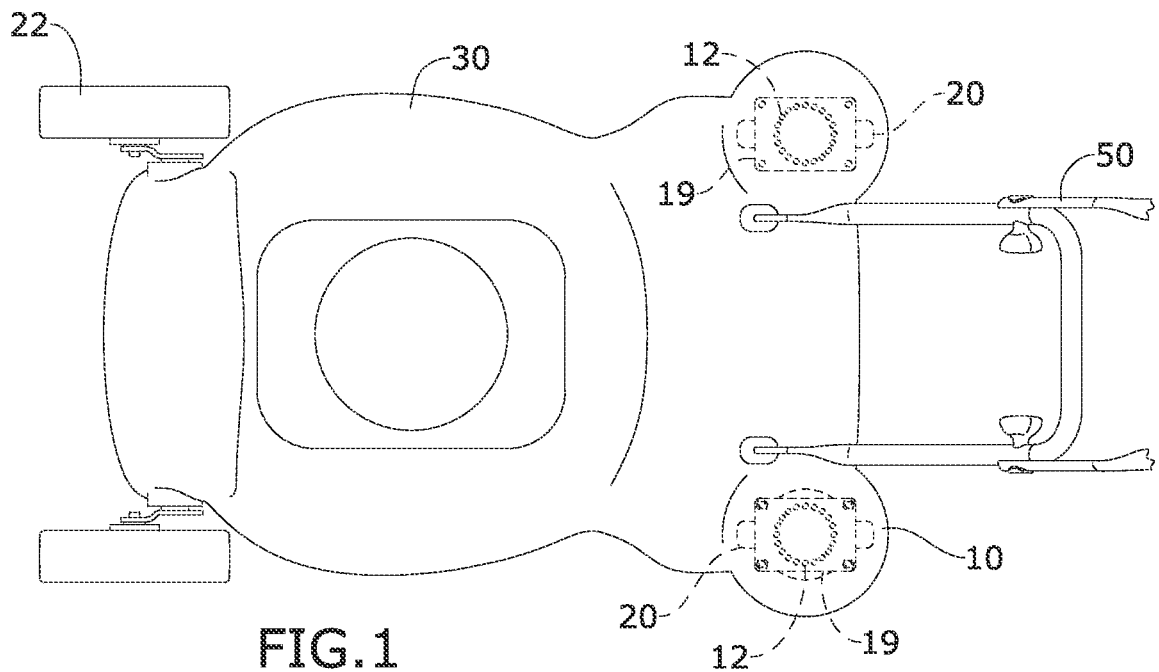
FIG.1
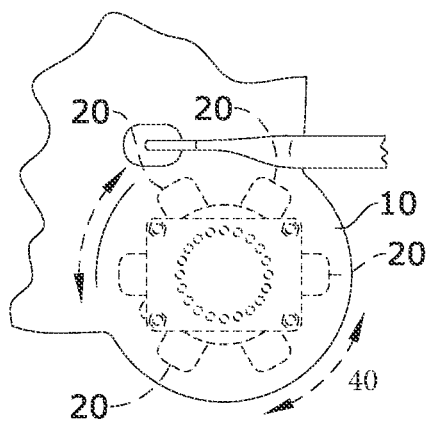
FIG.2
FIG. 3
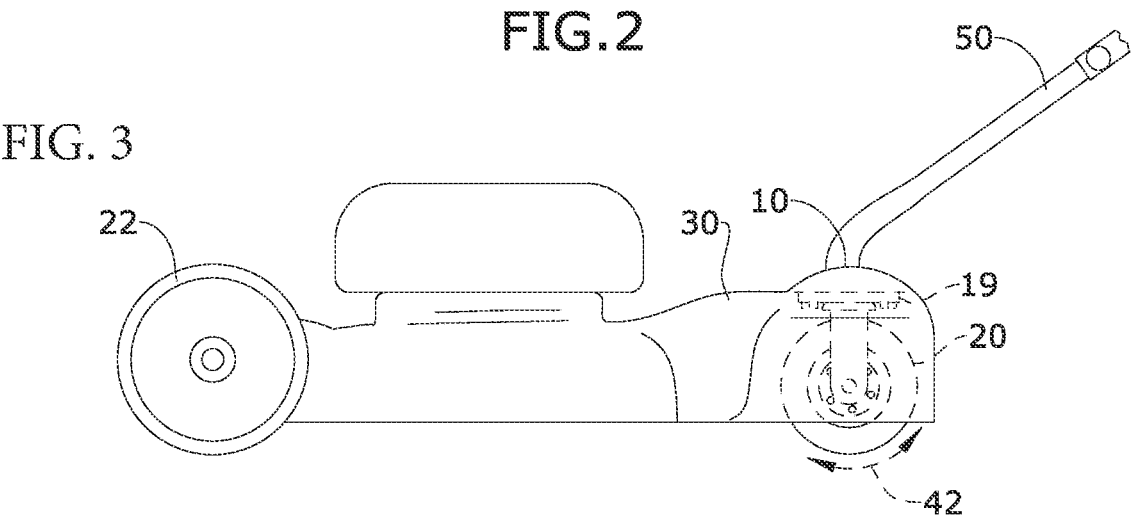

LAWN MOWER WITH SWIVELING REAR WHEELS

CROSS-REFERENCE TO RELATED APPLICATION

This application claims the benefit of priority of U.S. provisional application No. 63/260,856, filed on Sep. 2, 2021, the contents of which are herein incorporated by reference.

BACKGROUND OF THE INVENTION

The present invention relates to lawn mowers and, more particularly, to a lawn mower with two swiveling rear wheels.

Almost every household in America has a lawn mower. Most lawn mowers have four wheels and are walk behind lawn mowers. Each wheel is fixed and only allows for movement of the lawn mower in a forward or backward direction. These walk behind lawn mowers cannot easily turn. Turning requires either pushing down on a handlebar to lift a front end of the lawn mower or lifting the handlebar to pivot the lawn mower. Both methods are dangerous as they both expose the blades underneath.

Mowing a lawn typically requires turning the lawn mower multiple times. The blades, spinning at a high speed, are exposed during each turn. Turning the lawn mower is tiring and dangerous. A person or pet may make contact with the blades when the blades are exposed. Moreover, the exposure provides an opening for an object underneath the lawn mower to escape. This escaping object may be projected at intense speed by the lawn mower blades, damaging anything in its path.

Some riding lawn mowers have turning front wheels. This, however, when applied to a walk behind lawn mower, causes unsteadiness when pushing. The lawn mower may swivel, and additional effort is required to maintain a straight path for the lawn mower.

As can be seen, there is a need for a lawn mower that may turn without exposing the blades and easily follows a straight path.

SUMMARY OF THE INVENTION

In one aspect of the present invention, a walk behind lawn mower comprises two front wheels on a first end of the lawn mower and two domes on a second end of the lawn mower. The domes are incorporated into the deck of the lawn mower. Underneath each dome is a rear wheel which swivels on a swivel axis and rotates on a rotational axis, perpendicular to the swivel axis. The combination of the swivel and the rotation enable the lawn mower to pivot using a front wheel as the fulcrum for the pivot.

These and other features, aspects and advantages of the present invention will become better understood with reference to the following drawings, description, and claims.

BRIEF DESCRIPTION OF THE DRAWINGS

FIG. 1 is a top plan view of a walk behind lawn mower according to an embodiment of the present invention;

FIG. 2 is a detailed view of a rear wheel and dome thereof;

FIG. 3 is a side elevation view thereof;

DETAILED DESCRIPTION OF THE INVENTION

Figure 4:
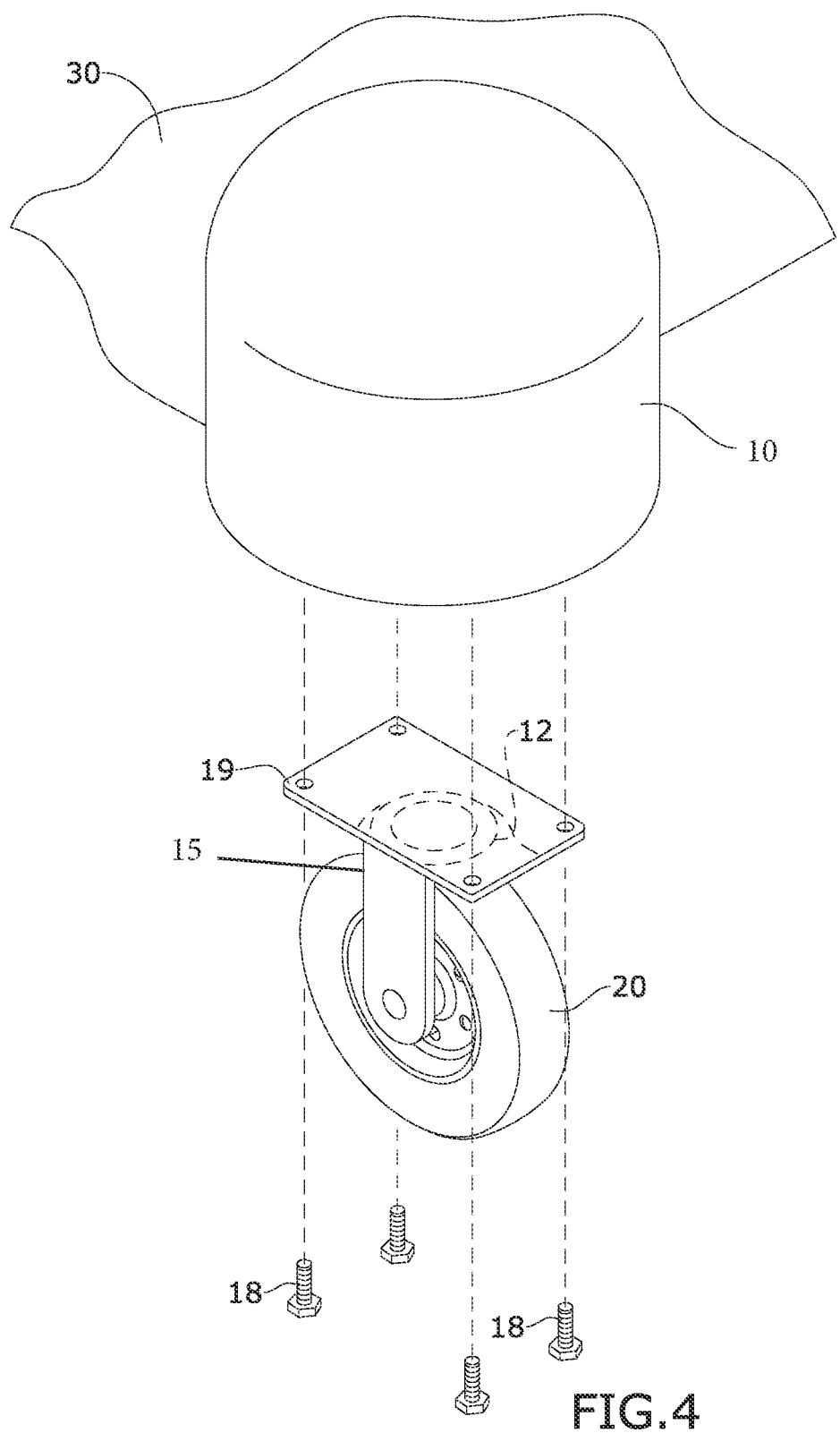
FIG. 4 is an exploded view of the rear wheel and dome thereof.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims with reference to the drawings.

Broadly, an embodiment of the present invention provides a walk behind lawn mower or lawn mowing device with two swiveling rear wheels enabling the lawn mower to pivot.

A dome or a bulge may be incorporated into or attached to a deck of a lawn mower above each rear wheel. Each rear wheel may be located underneath or housed in a dome. The dome may house attachment hardware connecting the rear wheel to the dome. The attachment hardware enables a swiveling of the rear wheel along a vertical swivel axis. The attachment hardware may be a swivel caster with a bearing and a plate. The attachment hardware may alternatively be a nut and bolt. The dome may include a hole for the insertion of the attachment hardware. The hole may be threaded.

A bracket may extend from the rear wheel. The rear wheel may rotate on a horizontal rotational axis within the bracket, without rotating the bracket. The rotational axis may be perpendicular to the swivel axis. The bracket may connect the rear wheel to the attachment hardware in the dome.

The rear wheels may swivel along their swivel axis and rotate along their rotational axis, enabling a pivoting of the lawn mower. A front wheel may be a fulcrum of the pivot. A user may apply a lateral force to a side of a handlebar of the lawn mower to pivot the lawn mower. The handlebar of the lawn mower may be attached to an outside of the lawn mower with the domes between a first attachment point and a second attachment point of the handlebar.

Referring now to the Figures, FIGS. 1 through 4 depict a walk behind lawn mower according to an embodiment of the present invention. As shown in FIG. 1, the lawn mower includes a deck 30 and two front wheels 22 known in the art attached to the deck 30 at a first end, for example, at two front corners of the deck 30. The front wheels 22 are rotatably coupled with the first end of the lawn mower deck 30. Two domes 10 are embedded in the deck 30 at a second end of the deck 30, opposite the first end having the front wheels 22. For example, the domes 10 may protrude from each rear corner of the deck 30. A rear wheel 20 is pivotally attached to an interior of each dome 10. A handlebar 50 is attached to the deck 30 at the second end by any suitable means. An attachment position of the handlebar 50 may vary according to a location of the domes 10 within the deck 30.

Each rear wheel 20 may turn about multiple axes, as shown in FIGS. 2 and 3. A bracket 15 extends from each rear wheel 20 and attaches to a bearing 12 and a plate 19, as best seen in FIG. 4. Each plate 19 is fastened to its corresponding dome 10 by four fasteners 18. Each rear wheel 20 may swivel around a swivel axis as depicted by arc 40. The swivel is accomplished by a rotation of the bracket 15 on the plate 19 via the bearing 12. While not limiting the motion of the rear wheels 20, FIG. 2 depicts different swivelable positions of the rear wheel 20 as it swivels. The rear wheel 20 is also rotatable and may rotate within the bracket 15 around a rotational axis as depicted by arc 42.

Figure 5:
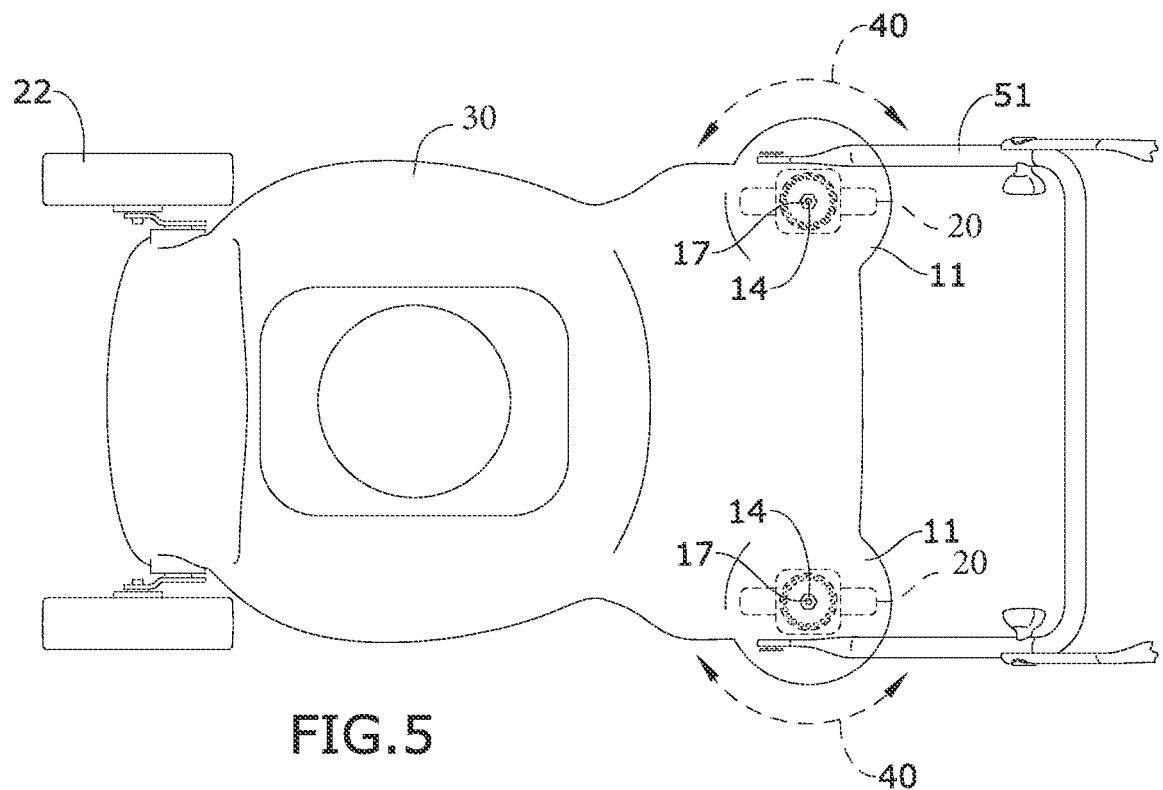
FIG. 5 is a top plan view of a walk behind lawn mower according to another embodiment of the present invention.
Figure 6:
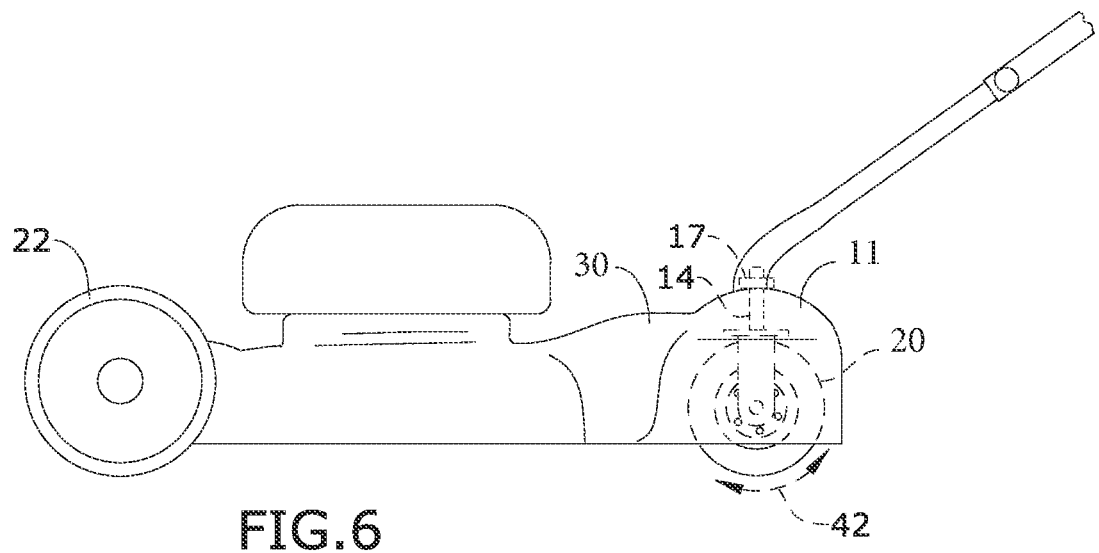
FIG. 6 is a side elevation view thereof.
Figure 7:
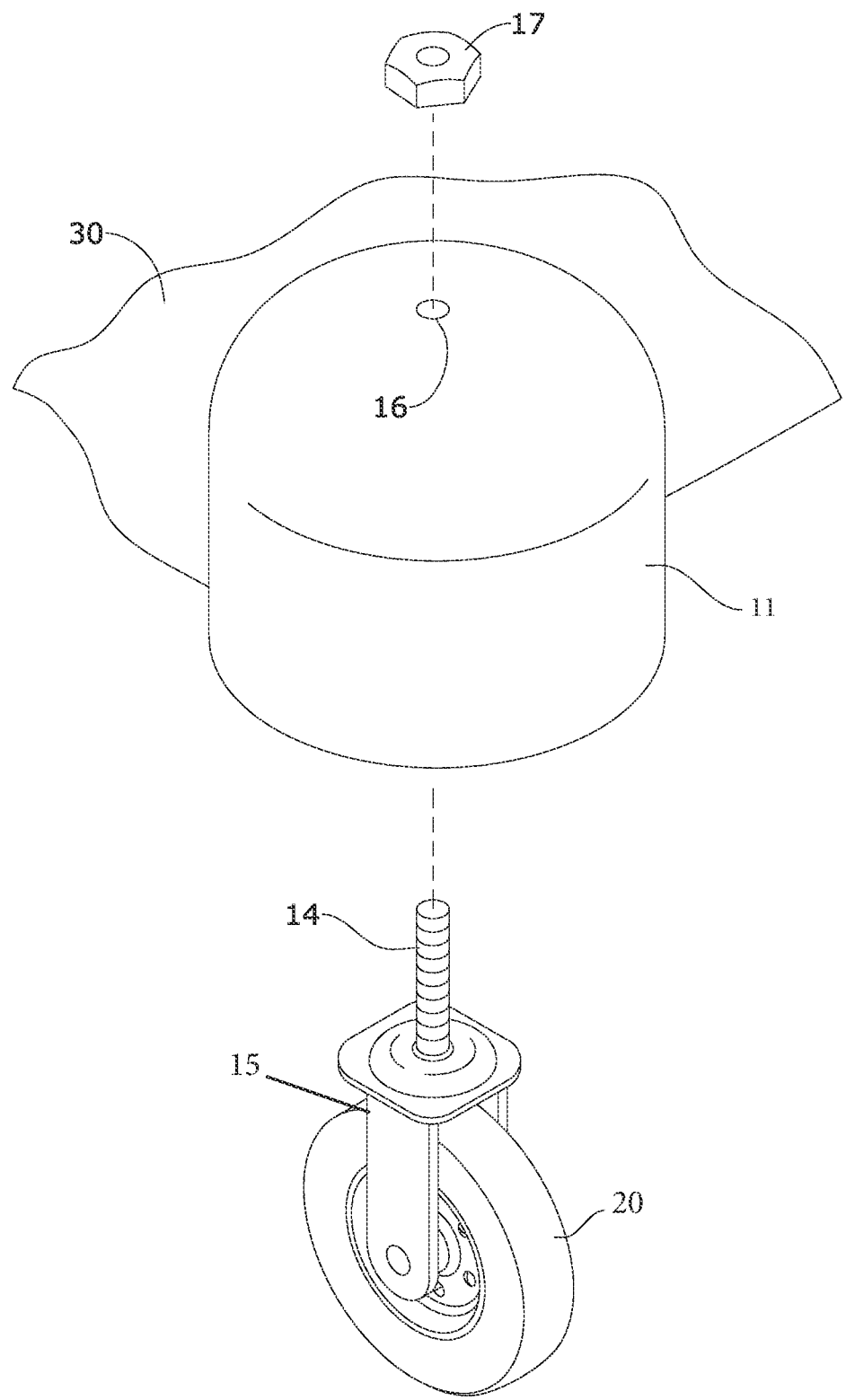
FIG. 7 is an exploded view of a rear wheel and dome thereof.

FIGS. 5 and 6 show a walk behind lawn mower according to another embodiment of the present invention and illustrate the rotational and swivel movements of the rear wheels. A second embodiment of a handlebar 51 is attached to the deck 30 with domes 11 positioned between the attachment points. Each rear wheel 20 is pivotally bolted to a second embodiment of the dome 11 by a nut 17 and a bolt 14. FIG. 7 is an exploded view of the rear wheel 20 and the second embodiment of the dome 11. The bolt 14 extends from the bracket 15 of the rear wheel 20. Said bolt 14 penetrates a hole 16 in the second embodiment of the dome 11 and is secured by a nut 17.

The attachment means are not particularly limited. A rear wheel 20 may be attached to dome 10, 11 of the lawn mower deck 30 by either the fasteners 18 and the plate 19 of FIGS. 1-4 or the nut 17 and the bolt 14 of FIGS. 5-7. Similarly, the handlebar 50 may be attached to the deck 30 at points between the domes 10 as shown in FIGS. 1 and 3 or the second embodiment of the handlebar 51 may be attached to the deck 30 at points having the domes 11 therebetween, as shown in FIGS. 5-6, to accommodate a predetermined dome 10, 11 placement within the deck 30.

It should be understood, of course, that the foregoing relates to exemplary embodiments of the invention and that modifications may be made without departing from the spirit and scope of the invention as set forth in the following claims.

What is claimed is:

1. A walk behind lawn mowing device comprising:
   a lawn mower deck;
   two front wheels rotatably coupled with a first end of the lawn mower deck;
   two domes embedded in a second end of the lawn mower deck, opposite the two front wheels; each dome comprising an upper dome surface that rises vertically above the lawn mower deck
   a handlebar attached to the second end of the lawn mower deck at two attachment points, with two rear wheels joined to the lawn mower deck therebetween; and
   each rear wheel with a bracket extending therefrom attached to one of the two domes;
   wherein each rear wheel is rotatable within its bracket on a horizontal rotational axis and each rear wheel is swivelable within its respective dome on a vertical swivel axis, perpendicular to the horizontal rotational axis.

2. The device of claim 1, wherein each bracket further comprises a bearing rotatably coupled with a plate, such that the respective rear wheel is swivelable by rotation of the bearing, and the plate is attached to its respective dome by fasteners.

3. The device of claim 1, wherein each bracket is rotatably attached to its respective dome by a nut and a bolt, and each rear wheel is swivelable by a rotation of the respective bolt within its respective dome.

4. A method of pivoting a lawn mowing device comprising:
   providing the walk behind lawn mowing device of claim 1;
   applying a lateral force to the handlebar of the lawn mowing device;
   swiveling the rear wheels of the lawn mowing device on the vertical swivel axis; and
   rotating the rear wheels on the horizontal rotational axis, thereby pivoting the lawn mowing device around one of the two front wheels acting as a fulcrum.

* * * * *